United States Patent
Dodge

[11] Patent Number: 5,964,661
[45] Date of Patent: *Oct. 12, 1999

[54] APPARATUS AND METHOD FOR TIMING VIDEO GAMES

[76] Inventor: Samuel D. Dodge, 9767 Arrowsmith Ave. S., Seattle, Wash. 98118

[*] Notice: This patent issued on a continued prosecution application filed under 37 CFR 1.53(d), and is subject to the twenty year patent term provisions of 35 U.S.C. 154(a)(2).

[21] Appl. No.: 08/753,320

[22] Filed: Nov. 22, 1996

Related U.S. Application Data

[60] Provisional application No. 60/007,536, Nov. 24, 1995.

[51] Int. Cl.$^6$ .......................................................... A63F 9/24
[52] U.S. Cl. ......................... 463/24; 348/725; 273/148 B
[58] Field of Search ................... 463/24, 29, 44, 463/47; 273/148 B; 364/410, 707; 395/750.03, 750.01, 750.02, 750.04, 750.05, 750.06, 750.07, 750.08; 348/5.5, 1, 725, 819

[56] References Cited

U.S. PATENT DOCUMENTS

| | | | |
|---|---|---|---|
| 3,833,779 | 9/1974 | Leone | 348/725 |
| 4,566,033 | 1/1986 | Reidenouer | 348/725 |
| 4,593,376 | 6/1986 | Volk . | |
| 5,078,399 | 1/1992 | Lennon, Jr. | 273/148 B |
| 5,203,848 | 4/1993 | Wang . | |
| 5,267,734 | 12/1993 | Stamper . | |
| 5,331,353 | 7/1994 | Levenson et al. | 348/725 |

*Primary Examiner*—Michael O'Neill
*Attorney, Agent, or Firm*—Donna J. Thies

[57] ABSTRACT

A timing system for a video game unit. The video game timer is a stand alone device, that works independently of existing video game unit ROM and is adaptable for use on a console or hand held video game unit. The system has software controlled functions for easy redesign. The timer system interrupts the power supply of the video game unit and can be connected to any interface on the game unit when power is present. In a first and second preferred embodiments the timer is connected to a power input jack of the video game unit. In a third embodiment the timer is inserted into the slot that ordinarily holds the game cartridge. In a fourth embodiment the timer is inserted into the battery cover slot. The system can be accomplished in a microcontroller or as discrete electronic components. A method of timing the use of video games is also disclosed.

20 Claims, 5 Drawing Sheets

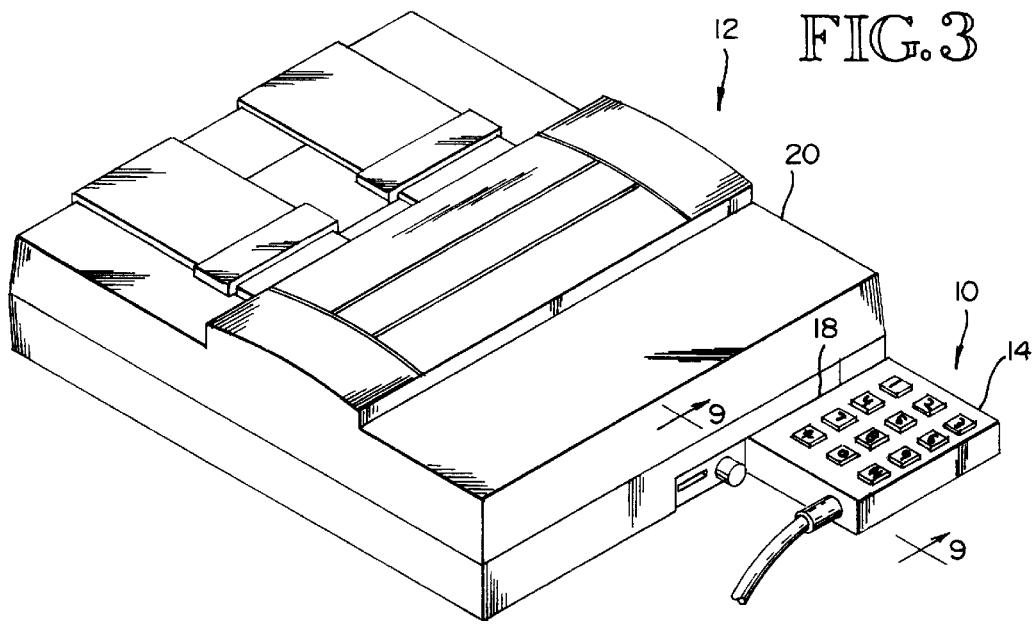
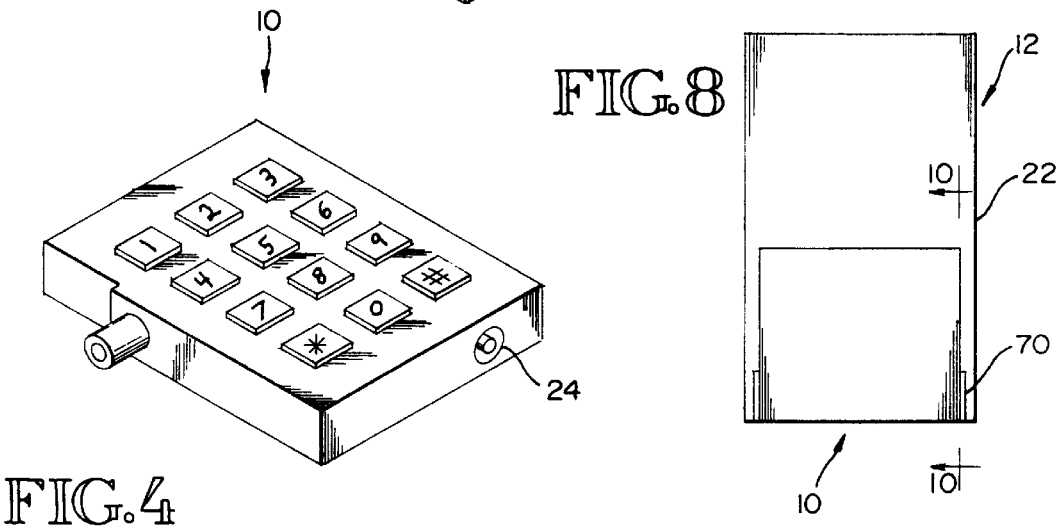
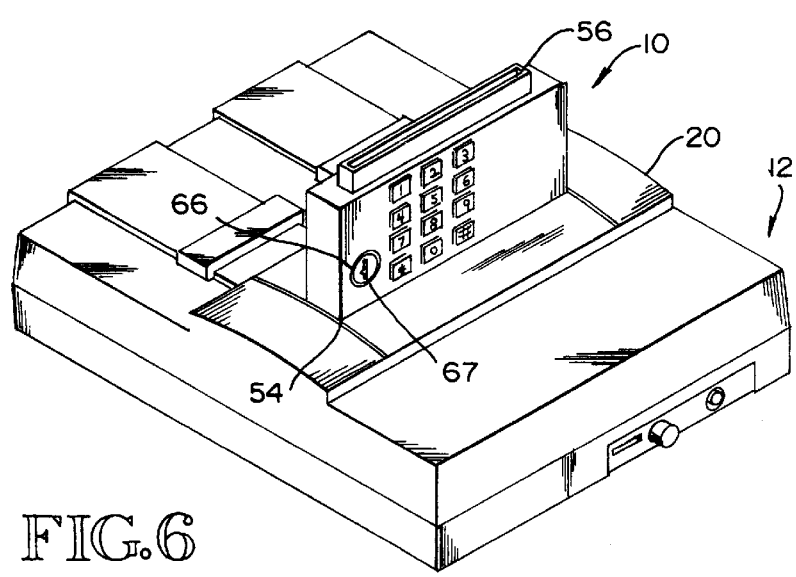

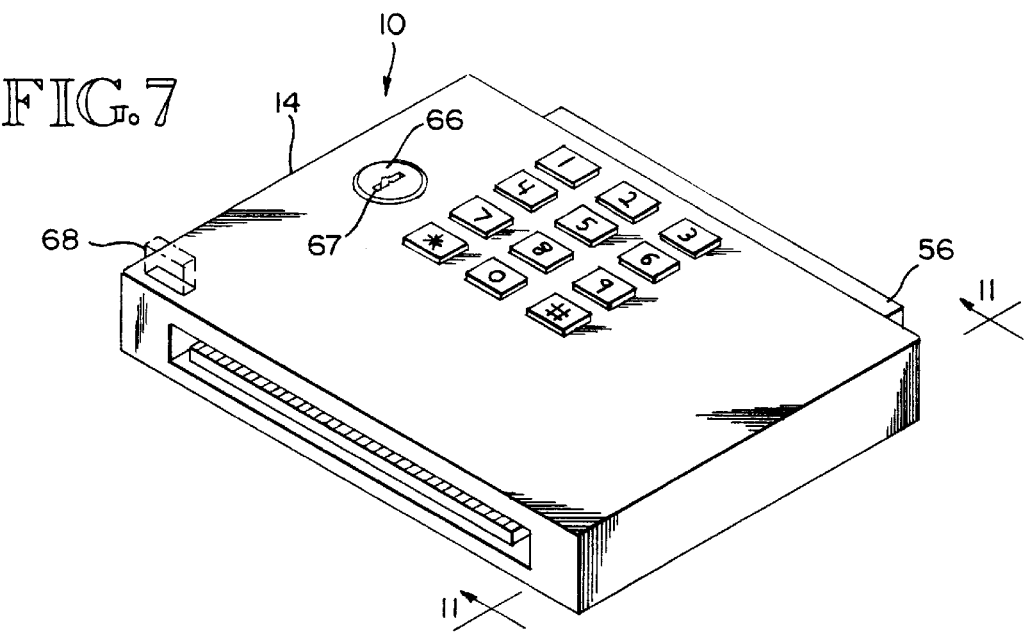
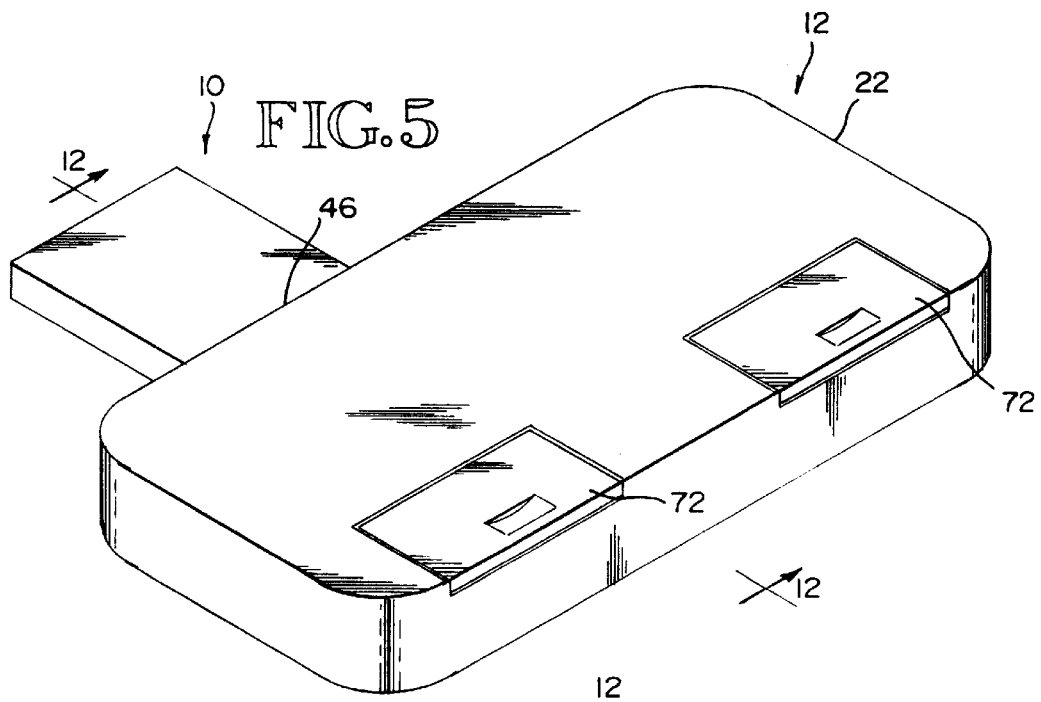
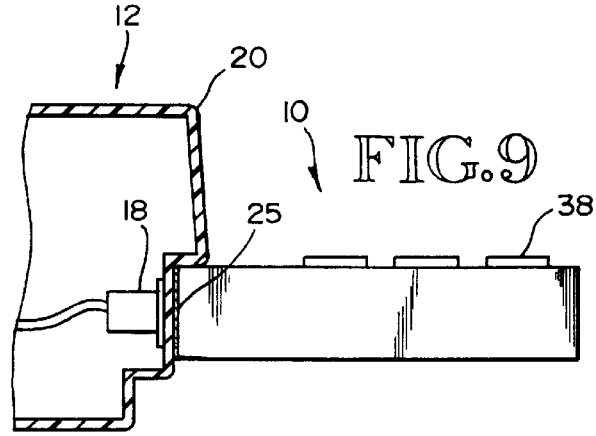

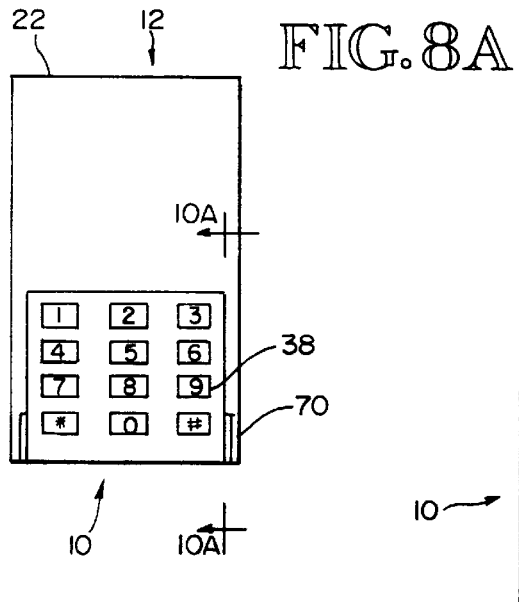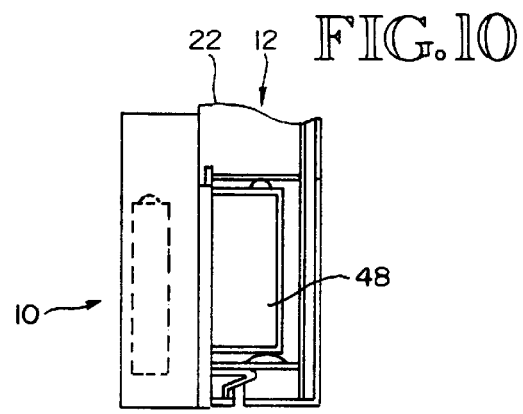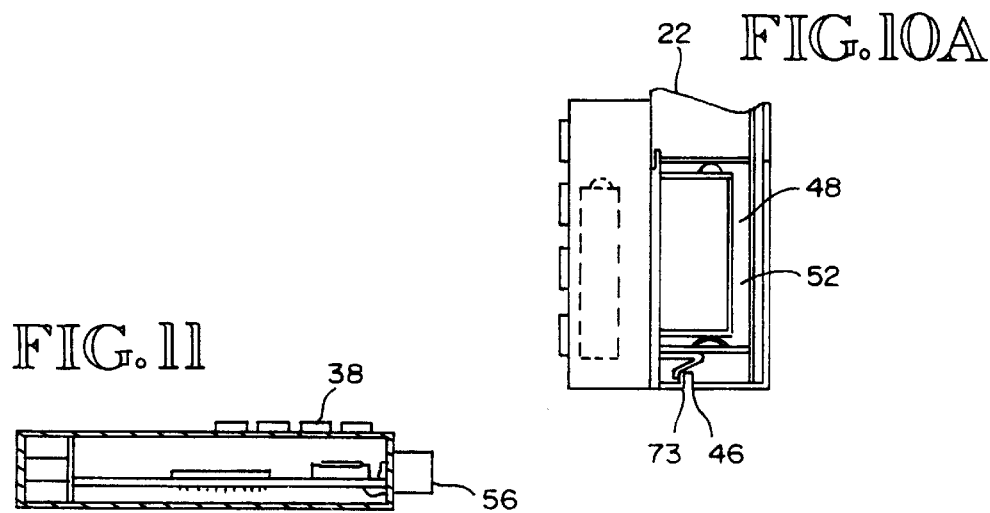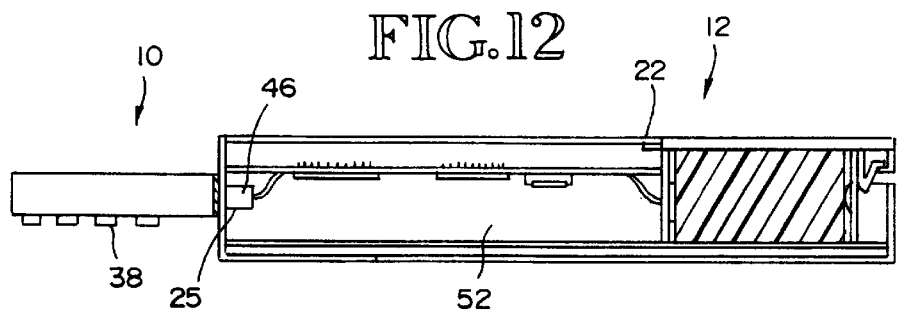

APPARATUS AND METHOD FOR TIMING VIDEO GAMES

This application claims benefit of Provisional application Ser. No. 60/007,536 filed Nov. 24, 1995.

BACKGROUND OF THE INVENTION

With the advent of video games played on a variety of systems there has come the ancillary problem of children and even adults spending too much time participating in the use of these games. It is, therefore, desirable to provide a timing device to limit the amount of time spent using such video games, regardless of the system that is used, that is easy to operate and is inexpensive to manufacture particularly within the perspective of the cost of the video games and systems on which they run. In an effort to address this problem, the prior art has devised complex systems to work with the existing circuitry of a video game system thereby resorting to assumptions about how the video game systems electronics work.

U.S. Pat. No. 4,593,376 to Volk discloses a video cartridge vending system with circuitry for disabling the cartridge after the rental time has run out.

U.S. Pat. No. 5,203,848 to Wang teaches a timer for controlling the allowable playing time range within daytime hours of a television game console having a CPU which interfaces with the read only memory unit of a game cartridge. This device requires program set up on a TV screen similar to that required to program a VCR and interfaces with the existing circuitry of a video game system.

U.S. Pat. No. 5,267,734 to Stamper, et. al. discloses a video game with a calendar function for dictating times during which the game must be played.

SUMMARY OF THE INVENTION

In order to overcome problems inherent in the prior art, there has been accomplished by the present video game timer, a stand alone device which, because it does not interface with the existing ROM of a game cartridge or the existing circuitry of a video game system, can be adapted for use with any pre-existing or unaltered video game system including a console, or hand held system. The video game timer of the present invention in all embodiments, has various functions which are software controlled so that functions can be easily redesigned and changed and also so that the video game timer is not dependent on interfacing with an existing ROM of any game cartridge or hardware of any particular game unit. In general, the present invention uses a timer system which interrupts the power supply of a game unit and as such can be connected to any interface on the game unit where power is present. The video game timer is adaptable for use on any kind of video game unit. Each brand of video game unit has a different means of supplying power to the video game unit. The present invention is adaptable in its various embodiments to each type of game unit and power supply. The present timer in the hand held battery operated units allows, by means of moving a simple manual switch located inside the timer, the setting of a time period during every twenty-four hours during which the game may be played and further sets a play time duration in 30 minute increments. If the game unit is not started a the beginning of the time period, play time is not shortened. After setting the internal time switch, the timer is inserted in the appropriate position in the game unit and locked in place. The insertion or attachment process breaks the direct connection between the power supply and the game unit. The present video game timer then polls to see if the unit has been turned on. When it has, the timer starts a master clock which begins to time the play time duration setting. The master clock thereby comprises two counters, the play period counter and the twenty-four hour counter. The time between when the master clock registers twenty-four hours and when the game unit is turned on is not subtracted from the next twenty-four hour interval. Thus, if the timer is inserted on Thursday at 5 p.m. but play is not commenced until 7 p.m., the game unit would not be available until 7 p.m. on Friday unless the timer is removed and reinserted in its appropriate position at some other time. In two of the preferred embodiments of the present invention, the timer is used with a larger game console in a first embodiment, or hand held game unit in a second embodiment, and the timer is in the form of a box having a controllable switch, the timer is attached to the power input jack of the video game console or the hand held game unit. In these embodiments, a power input jack and a power output plug are provided on the timer for attaching the box to the power input jack of the video game unit console or hand held unit, such that the power supplies that are normally plugged into the video game unit would be required to plug into the box of the video game timer instead. In these embodiments, a keyboard allows the user to input an access code and a play time duration.

In another third preferred embodiment of the present invention, wherein the timer is also used with a large game console, and it is within the spirit and scope of the invention to be used on a hand held game unit, the timer is inserted into the slot where the game cartridge is ordinarily inserted and then the game cartridge is inserted after the timer. In another fourth embodiment when used with a hand held video game player, the timer of the present invention is inserted in place of the existing battery cover. In any of the embodiments, using a game console or a hand held game unit, there is a locking means to prevent removal of the timer and in all the second embodiments, the timer of the present invention is powered by the game unit's battery, but draws only a small amount of current.

In any of the embodiments, it is within the spirit and scope of the invention to provide the necessary components in the form of discrete components or a microcontroller within the timer.

It is therefore an object and advantage of the present invention to provide a video game timer that is easy to use requiring minimum input from the user.

It is another object and advantage of the present invention to provide a video game timer that operates as a stand alone device that is independent of any game cartridge ROM or video game unit hardware.

It is still yet another object and advantage of the present invention to provide a video game timer that is inexpensive to manufacture.

It is still yet another object and advantage of the present invention to provide a discrete component or microcontroller controlled video game timer, the microcontroller video game timer being software driven and thus flexible in changing and adapting functions.

It is yet another object and advantage of the present invention to provide a video game timer that is compatible with any make or type of video game unit.

These and other objects and advantages will become apparent after a thorough review of the following specification and drawings.

BRIEF DESCRIPTION OF THE DRAWINGS

FIG. 3 is an environmental view showing a first embodiment of the video game timer of the present invention as it is attached to a video game unit and specifically how the video game timer is in the form of a box having a controllable switch attached to the power input jack of the video game console.

FIG. 4 is a perspective view of the first embodiment of the video game timer as it would be used in a video game console.

FIG. 5 is a rear view showing the second embodiment of the video game timer of the present invention as it is positioned in a hand held video game unit and showing how the timer of the second embodiment attaches to the power input jack of a hand held video game unit.

FIG. 6 is a environmental view of the third embodiment of the video game timer of the present invention as it is positioned in a video game console and specifically how the video game timer is inserted into the slot which ordinarily holds the game cartridge.

FIG. 7 is a perspective view of the third embodiment of the video game timer as it would be used in a video game console.

FIG. 8 is a rear view of the fourth embodiment of the video game timer of the present invention showing the timer as it is positioned in the battery cover slot of a hand held video game unit and using discrete components to accomplish the timing functions.

FIG. 8A is a rear view of the fourth embodiment of the video game timer of the present invention showing the timer as it is positioned in the battery cover slot of a hand held video game unit and using a microcontroller to accomplish the timing functions.

FIG. 9 is a cross-sectional view taken through line 9—9 of FIG. 3 showing the first embodiment of the video game timer.

FIG. 10 is a cross-sectional view taken through line 10—10 of FIG. 8 showing the fourth embodiment of the present video game timer using discrete components to accomplish the timing function.

FIG. 10A is a cross-sectional view taken through line 10A—10A of FIG. 8A showing the fourth embodiment of the present video game timer using a microcontroller to accomplish the timing functions.

FIG. 11 is a cross-sectional view taken through line 11—11 of FIG. 7 showing the third embodiment of the video game timer.

FIG. 12 is a cross-sectional view taken through line 12—12 of FIG. 5 showing the second embodiment of the present video game timer.

DESCRIPTION OF THE PREFERRED EMBODIMENT

Figure 1:
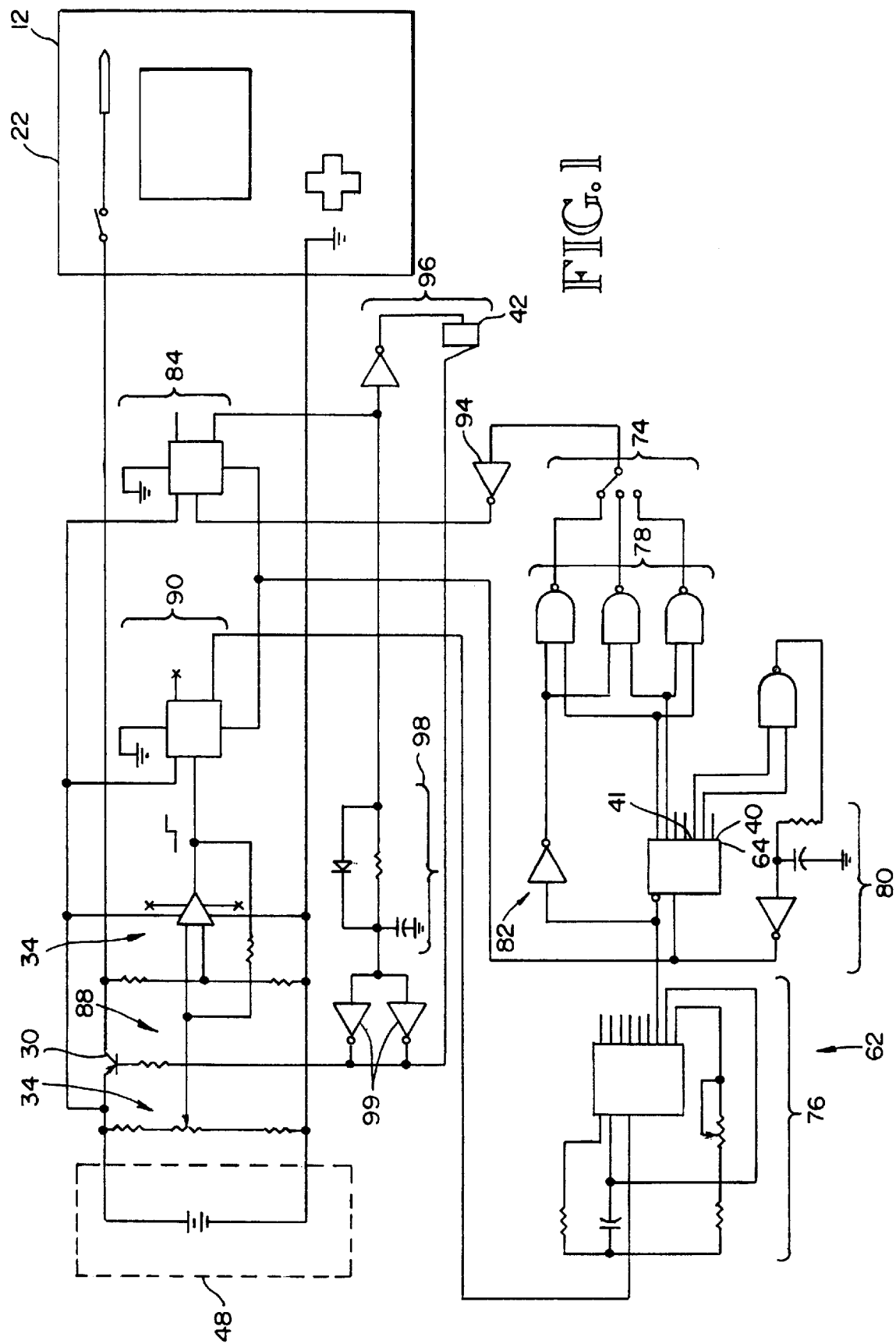
FIG. 1 is a schematic view of all the embodiments of the present video game timer using discrete components in the timer.

In general, the present timer for video games uses a timing system which interrupts the power supply of a video game unit whether it be a game console or a hand held game unit. As such, the video game timer may be connected to any interface that uses power that is available on the game console or hand held video game unit. The video game timer of the present invention can also be made using discrete components as shown in FIG. 1 or a microcontroller as shown in FIG. 2 and will be described hereinafter.

Referring now to the drawings in general and in particular to FIG. 3 of the drawings there is shown an environmental view, showing a first embodiment of the present video game timer, shown generally by the number 10, as it is attached to a video game unit 12 and specifically how the video game timer 10 is in the form of a box 14, the box 14 is attached to the power input jack 18 of a video game console 20. In the drawings, the number 12 refers in general to a video game unit, either a video game console 20 or a hand held video unit 22 as shown in FIGS. 5 and 8. In FIG. 3, the interface to which the video game timer 10 connects is the power input jack 18 of a video game console 20.

The video game timer 10 of the first embodiment as shown in FIGS. 3 and 4 is interposed between the video game power supply (not shown) and the video game console 20 thus, the video game timer 10 serves to interrupt the power supply to the video game console 20 in the first embodiment. The video game timer 10 is plugged into the power input jack 18 of the video game console 20 and the video game power supply (not shown) is plugged into the power input jack 18 of the video game timer 10. When the video game timer 10 is plugged into the power input jack 18 of the video game unit 12, the user should apply a small amount of adhesive 25, as shown in FIGS. 9 and 12, around the power input jack 18 of the video game unit 12. This ensures that once the video game timer 10 is installed it cannot be sabotaged by someone simply pulling out the timer 10 and replacing the power cord that was previously on the video game unit 12. This should be done in the first embodiment using a video game console 20 as shown in FIG. 9 and in the second embodiment using a hand held video game unit 22 as shown in FIG. 12.

Figure 2:
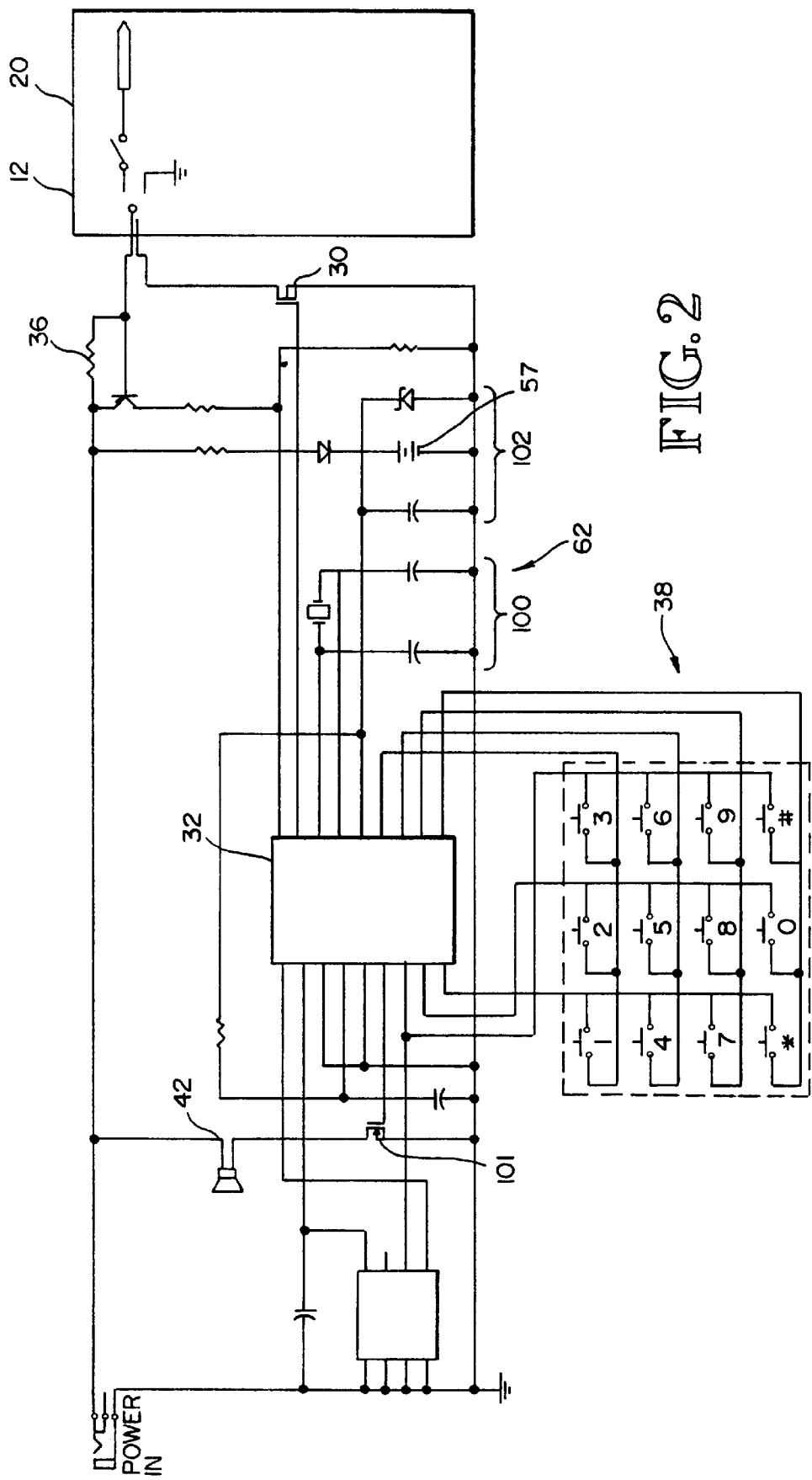
FIG. 2 is a schematic view of all the embodiments of the present video game timer using a microcontroller to control the timer.

A solid state switch 30 of the video game timer 10 as seen in FIGS. 1 and 2 turns the power to the video game unit on and off. This switch 30 is controlled by a microcontroller 32 in the video game timer 10 as seen in FIG. 2. A comparitor circuit 34 that acts as a sensor as seen in FIG. 1 or a sensor 36 associated with the microcontroller 32 as seen in FIG. 2 polls to determine if the video game unit 12 is being played. The microcontroller 32 also as seen in FIG. 2 also polls to determine if there are any inputs from the twelve key keyboard 38 and keeps track of time from a twenty-four hour counter 40 in FIG. 1 or a twenty-four hour counter internal to the microcontroller 32 as seen in FIG. 2. A small audio transducer 42 as seen in FIGS. 1 and 2 is used to provide feedback to the user, specifically a tone is transmitted in response to input on the keyboard 38, and the audio transducer 42 also provides a warning beep five seconds before power is turned off to the video game console 20. In the microcontroller version of the video game timer 10 as shown in FIG. 2, the software resides in the non-volatile memory 44. The keyboard 38 is used to gain access to the stored information in the non-volatile memory 44 of the microcontroller 32 and the audio transducer 42 provides feedback to the user thereby insuring a simple programming of the video game timer 10 contrary to that which is required by the prior art.

Some fixed parameters are preset within the timer and cannot be reprogrammed by the user. One such parameter is that all operations the video game timer 10 performs will repeat in twenty-four hour cycles. The video game unit 12 can be turned on during a fixed two hour period sometime during the twenty-four hour cycle. Once the video game unit 12 is turned on and the game is played for the allowed play time, a new play time cannot be commenced until the next twenty-four hour cycle. And, all access to changing the beginning of the twenty four hour period and the duration of the play time is guarded by an access code that may be changed but not bypassed.

The variable parameters can be changed at will by the user. They include the access code, the start of the twenty-four hour cycle and the play time duration.

In operation, then, the user places appropriate batteries in the video game timer 10. The video game unit's 12 normal power supply (not shown) is then plugged into the video game timer's power input jack 24, as seen in FIG. 4 thus starting the twenty-four hour counter 40 as seen in FIG. 1 and activating the keyboard 38. To gain access to the video game timer 10, two keys on the keyboard 38 are pressed simultaneously to lessen the chance that an accidental access request will be initialized. Safeguards are provided to prevent the inputting of all possible combinations in a short period of time to try to bypass the access code originally entered by the user. After the access code has been input, the video game timer 10 later recognizes the correct code and allows the user to set the duration of play time as a three digit number.

It is within the spirit and scope of the present invention to provide the components necessary for accomplishing the timing functions of the first embodiment as it is used on a video game console in the form of discrete components as shown in FIG. 1 or in the form of a microcontroller with similar components as shown in FIG. 2.

Referring now to FIG. 5 of the drawings there is shown a rear view of the second embodiment of the video game timer 10 of the present invention as it is positioned in a hand held video game unit 22.

In the second embodiment as shown in FIG. 5 and FIG. 12, the timer 10 plugs into the power input jack 46 of a hand held video game unit 22 and interrupts the external power supply (not shown) to the hand held video game unit 22, as seen most clearly in FIG. 12. This may be somewhat impractical for the hand held game units 22 that do not use large amounts of battery power. However, since some of the hand held video game units 22 use a great deal of power, an optional external power pack (not shown) is usually provided to plug into the game unit's power input jack 46 such that the hand held video game unit 22 can be plugged into conventional household current. In this situation, it is within the spirit and scope of the invention to provide the video game timer 10 of the second embodiment that is much like the timer 10 of the first embodiment but in a size that would be appropriate for a hand held game unit 22. When the timer 10 is plugged into the power input jack 46 of a hand held game unit 22, the internal batteries 48 (as seen in FIG. 10) of the hand held game unit 22 would most likely be disconnected. However, in order to ensure that the timer 10 is not sabotaged by the removal of the timer 10 and reinsertion of batteries 48 into the battery compartment 52 (not seen in FIGS. 5 or 12 but as seen in FIG. 10) in the second embodiment, the batteries 48 of the hand held game unit 22 could be removed and the battery cover 50 locked in place. Also, adhesive 25 should be added around the power input jack 46 of the hand held unit 22 as described with reference to the first embodiment and as shown in FIG. 9.

It is also within the spirit and scope of the present invention to provide the components necessary for accomplishing the timing functions of the second embodiment as it is used on a hand held game unit 22 in the form of discrete components as shown in FIG. 1 or in the form of a microcontroller with similar components as shown in FIG. 2.

Referring now to FIGS. 6 and 7 of the drawings there is shown an environmental view and perspective view respectively, showing a third embodiment of the present video game timer as it is positioned in a video game console 20. It can be seen in FIGS. 6 and 7 that the video game timer 10 of the third embodiment has been inserted into the slot 54 which ordinarily carries the video game cartridge 56 thus, the video game timer 10 serves to interrupt the power supply to the video game cartridge 56 in the third embodiment as shown in FIGS. 6 and 7. After the video game timer 10 of the third embodiment of the present invention has the batteries 57, as seen in FIG. 2, inserted the video game timer 10 is inserted into the slot 54, which ordinarily holds the game cartridge 56, the insertion process thereby breaking the direct connection between the power source of the video game console 20 and the video game cartridge 56 and thereby powering the video game timer 10. As the video game timer 10 is powered up, the timer 10 resets itself and closes the connection between the power source of the video game console 20, as seen in FIG. 2, and the video game cartridge 56. In a manner similar to that of the first and second embodiments, in the third embodiment, the video game timer 10 begins polling to see if the video game console 20 has been turned on. When the video game console 20 is polled to be on, the timer 10 starts a master clock 62 as seen in the schematic drawings of FIGS. 1 and 2. This on command is irretrievable, thus the turning on and off of the switch 30 as seen in FIGS. 1 and 2, is ignored so that the player cannot keep resetting the video game timer 10 to extend the play time. The master clock 62 as seen in the schematic drawings of FIGS. 1 and 2 comprises two counters, a play period counter 64 and the twenty-four hour counter 40, both within the counter 41, as seen in FIG. 1. The play period counter and the twenty-four hour counter are internal to the microcontroller 32 in FIG. 2. The play period counter 64 includes a five second beep prior to shutting off the video game unit 12 so that the player may save his game if desired. The twenty-four hour counter 40 cannot be reset by any other means other than unlocking and removing the video game timer 10 by means of the locking means 66 as shown in FIGS. 6 and 7. The locking means 66 used in the third embodiment as shown in FIG. 6 replaces in principle, the adhesive 25 used in the first and second embodiments as seen most easily in FIGS. 9 and 12. The locking means 66, as seen in FIGS. 6 and 7, comprises a keyed lock 67 which controls a fastening bolt 68 as seen in FIGS. 7 and 11. Thus, when the video game timer 10 is inserted into the slot 54 which ordinarily holds the game cartridge 56 in the third embodiment, the user should turn the key (not shown) in the keyed lock 67 thus engaging the fastening bolt 68 in locked engagement with the video game console 20 as seen in FIG. 11. This will prevent someone from sabotaging the video game timer 10 by simply removing it from its position in front of the game cartridge 56. In operation, the time between when the master clock 62, as seen in FIGS. 1 and 2, registers twenty-four hours and the video game console 20 is turned on is not subtracted from the next twenty-four hour interval. Thus, if the video game timer 10 is inserted on Thursday at 5 p.m. but play is not commenced until 7 p.m. the console game unit would not be available again until 7 p.m. on Friday unless the video game timer 10 is removed and reinserted in its' position in the slot 54 in front of the video game cartridge 56.

It is within the spirit and scope of the present invention to provide the components necessary for accomplishing the timing functions of the third embodiment as it is used on a video game console 20 in the form of discrete components as shown in FIG. 1 or in the form of a microcontroller with similar components as shown in FIG. 2.

It is also within the spirit and scope of the present invention to provide a version of the third embodiment which would plug into the cartridge slot (not shown) of a hand held video game unit 22 and interrupt the power supply, usually a battery 48 as shown in FIG. 10, to the hand held video game unit. This would be somewhat impractical because of the size requirements of the video game timer 10 of the present invention. The timer 10 would necessarily be larger than the game cartridge (not shown) used with the hand held video game unit 22 and as such would detract from the portability feature of the game unit 22. The timer 10 would also be more easily broken if attached at this more vulnerable position on the hand held video game unit 22.

Referring now to FIG. 8 of the drawings there is shown a rear view of the fourth embodiment of the video game timer 10 as it is positioned in a hand held video game unit 22 and using discrete components to accomplish the timing functions. FIG. 10 is a cross-sectional view taken through line 10—10 of FIG. 8. It can be seen in FIG. 8 that the video game timer 10 of the fourth embodiment has been inserted into the slot 70 which ordinarily holds the battery cover 72 (not shown in FIG. 8, but shown in the hand held video game unit of FIG. 5). So, to insert the video game timer 10 of the fourth embodiment into a hand held video game unit 22, the battery cover 72 (not shown in FIG. 8, but shown in FIG. 5) is removed from the hand held video game unit 22 and replaced with the video game timer 10 of the fourth embodiment of the present invention. In this fourth embodiment using a hand held video game unit 22, a bypass switch (not shown) is provided which can be thrown to disable the video game timer 10 in the event that the time limits are not desired and the battery cover 72 (not shown in FIG. 8, but shown in the hand held video game unit 22 of FIG. 5) is unavailable. The bypass switch (not shown) would be in the fourth position of the internal play time selector switch 74 as will be described hereinafter with reference to FIG. 1. When the video game timer 10 is inserted into the slot 70 for the battery cover 72 (not shown in FIG. 8, but shown in FIG. 5) in the hand held video game unit 22 of the fourth embodiment of the present invention, the operation of the video game timer 10 is very much the same as in the larger video game console 20 of the third embodiment. Specifically, the insertion process breaks the direct connection between the battery 48 as seen in FIG. 10, and the hand held video game unit 22 and powers the video game timer 10. Upon powering up, the video game timer 10 resets itself thereby setting the twenty-four hour counter 40 of the master clock 62 as seen in FIG. 1, and polls to see if the game unit 22 is turned on. The play period counter 64 of the master clock 62 as seen in FIG. 1, begins its time interval count down according to the thirty minute interval that has been set after insertion of the video game timer 10 into the hand held video game unit 22. Again, the twenty-four hour counter and the play period counter are part of the microcontroller 32 in FIG. 2.

FIG. 8A is a rear view of the fourth embodiment of the video game timer of the present invention showing the timer 10 as it is positioned in the battery cover slot 70 of a hand held video game unit 22 and using a microcontroller 32, as seen in FIG. 2, to accomplish the timing functions. FIG. 10A is a cross-sectional view taken through line 10A—10A of FIG. 8A. In FIG. 8A, access to the timer 10 functions are no longer accomplished by insertion of the timer 10 into the slot 70 for the battery cover 72 as shown in FIG. 5 but through the keyboard 38 as described with reference to the other embodiments using a microcontroller 32. A locking means 66 similar to that described with reference to the third embodiment and FIG. 7 would also be provided in the fourth embodiment as shown in FIG. 8A so that the timer 10 could not easily be removed and the battery cover 72, as shown in FIG. 5, put back in place thereby sabotaging the timer 10. The power input jack 46 of the hand held game unit 22 should also be disabled, as seen in the fourth embodiment as shown in FIG. 8A, to prevent sabotage by the removal of the timer 10 and insertion of a video game power supply (not shown) into the power input jack 46. It is within the spirit and scope of the present invention to accomplish this in a number of ways. However, one of the simplest methods of disabling the power input jack 46 of the hand held game unit 22 is to insert a difficult to remove sleeve 73 over the central pin of the power input jack 46 as seen in FIG. 10A.

It is therefore also within the spirit and scope of the present invention to provide the components necessary for accomplishing the timing functions of the fourth embodiment as it is used on a hand held video game unit 22 in the form of discrete components as shown in FIG. 8 or in the form of a microcontroller with similar components as shown in FIG. 8A.

Referring now to FIG. 1 of the drawings there is shown a schematic view of the timer of the present invention used on either a video game console 20 or a hand held video game unit 22 and using discrete components. In FIG. 1 a hand held video game 22 is used as an example, however, it is to be understood that the same components would be used in the video game console 20 application or generally any video game unit 12. For purposes of illustration, FIG. 1 shows the video game unit 12 as a hand held video game unit 22, and FIG. 2 shows the video game unit 12 as a video game console 20, but it should be understood that the discrete components as shown in FIG. 1 are applicable to either a hand held video game unit 22 or a video game console 20 and so too, the microcontroller 32 timer 10 as shown in FIG. 2 is also applicable to either a video game console 20, or with minor modifications as will be described hereinafter, to a hand held video game unit 22. In FIG. 1 it can be seen that the master clock 62 that is a combination crystal oscillator and clock generator 76, provides a stable and precise clock source for the twenty four hour counter 40. The twenty four hour counter 40 counts twenty four hours plus of clock pulses generated by the clock generator 76. Outputs from the twenty four hour counter 40 are decoded by the decoder logic 78 to provide output after twenty four hours are counted. The output is shaped into a reset pulse by a pulse shaper generator 80.

Outputs from the twenty four hour counter 40 are also applied to the decoder logic 78 to provide output after thirty minutes, sixty minutes and ninety minutes of clock pulses are counted. An internal play time selector switch 74 indicates whether the user has selected thirty, sixty or ninety minutes of play time. Output from the clock generator 76 is applied through an inverter 82 to the decoder logic 78 to provide a clock used by a play time latch or flip flop 84. The comparitor circuit 34 is used as a sensor to sense when power is applied to the video game unit 12 and when the game unit 12 is in use. Output from the comparitor circuit 34 is used as a clocking input to a twenty four hour latch or flip flop 90. The twenty-four hour latch or flip flop 90 is used to control power to the video game unit 12 based on availability of play time within the current twenty four hour period. Output from the decoder logic 78 and internal play time selector switch 74 is applied through another inverter 94 as a clocking input to the play time latch or flip flop 84. This latch or flip flop 84 is used to control power to the video game unit 12 based on availability of play time within the selected maximum play time. When a selected play time is reached, the latch or flip flop 84 changes state. This state change applies a signal through a combination inverter and buffer 96 to the audio transducer 42 which transmits a beep to warn the user that the maximum selected play time is reached. In addition, when the latch or flip flop 84 changes state as the selected play time is reached, the output of the latch or flip flop 84 also applies a signal to a delay circuit 98. This delay circuit 98 delays approximately five seconds before power to the video game unit 12 is removed. This delay and the audio warning allows the user time to save a game before power is removed to the video game unit 12. After the five second delay is reached, the delay circuit 98 applies a signal to the combination inverters and buffers 99. These combination inverters and buffers 99 in turn apply a signal to a solid switch 30, thereby shutting off power to the video game unit 12.

FIG. 2 is a schematic view of the video game timer of the present invention using a microcontroller to perform the required tasks and using a video game console 20. Minor adjustments to apply FIG. 2 to a hand held game unit 22 will be described hereinafter. The microcontroller 32 has a built in Random Access Memory (RAM) and Read Only Memory (ROM). The microcontroller 32 is used for stored program execution and scans the keyboard 38 for user input of access codes and play times. This user input data and software to run the timer functions is stored in the non-volatile memory 44. A crystal oscillator circuit 100 provides the master clock 62 source for the microcontroller 32.

The microcontroller 32 provides the audio output and feedback to the user through the audio transducer 42 in a manner similar to that described with reference to FIG. 1. The audio transducer 42 of the microcontroller 32 is controlled by the solid state switch 101.

Power to the video game timer 10 is supplied by the batteries 57 in the timer power source circuit 102 when the video game unit 12 power in is not supplied or by tapping off the video game unit 12 power when the power in to the game unit 12 is supplied. The sensor 36 associated with the microcontroller 32 polls to determine if the video game unit 12 is being played.

Power to the video game unit 12 is controlled by the microcontroller 32 by controlling voltages applied to the solid state switch 30.

To adapt FIG. 2 so that a microcontoller is used to perform the required tasks using a hand held video game 22 as seen in FIGS. 8A and 10A, minor adjustments would be required. In the fourth embodiment using a hand held video game 22 as shown in FIGS. 8A and 10A, since the video game timer 10 is located atop the video game unit battery compartment 52, the batteries 48 of the hand held Video game unit 22 are used to power the timer 10 so that separate batteries 57, as seen in FIG. 2, for the timer 10 are not needed.

Having described my invention I claim:

1. A timing apparatus for a video game unit having a power supply, the timing apparatus comprising:
   interrupt means for interrupting power from the power supply;
   timing means connected to the interrupt means for timing when the power supply is interrupted wherein the timing means is user programmable as to time of day that the video game unit is used.

2. The timing apparatus for a video game unit as defined in claim 1 wherein the interrupt means is connected to a power carrying interface on the video game unit.

3. The timing apparatus for a video game unit as defined in claim 2 wherein the power carrying interface is a power input jack.

4. The timing apparatus for a video game unit as defined in claim 1 wherein the video game unit is a hand held unit.

5. the timing apparatus for a video game unit as defined in claim 1 wherein the video game unit is a console unit.

6. The timing apparatus for a video game unit as defined in claim 1 wherein the interrupt means and the timing means are accomplished by a microcontroller.

7. The timing apparatus for a video game unit as defined in claim 1 wherein the interrupt means and the timing means are accomplished by discrete electronic components.

8. A timing apparatus for a video game unit having a power supply, the timing apparatus comprising:
   interrupt means for interrupting power from the power supply and turning off the video game unit; wherein the interrupt means is connected to a power carrying interface on the video game unit and wherein the power carrying interface is a game cartridge receiving slot;
   timing means connected to the interrupt means for timing when the power supply is interrupted and the video game unit turned off.

9. The timing apparatus for a video game unit as defined in claim 2 wherein the power carrying interface is a battery interface.

10. The timing apparatus for a video game unit as defined in claim 1 wherein the timing means is user programmable to a plurality of variable play times.

11. The timing apparatus for a video game unit as defined in claim 1 wherein the timing means is user programmable as to duration of play time.

12. The timing apparatus for a video game unit as defined in claim 1 wherein the timing means is user programmable by means of input to a keyboard.

13. A method for timing the use of video games on a video game unit, the video game unit having a power supply, the method for timing the use of video games comprising the steps of:
   providing an interrupt means for interrupting power from the power supply and turning power off to the video game unit, wherein the interrupt means is connected to a power carrying interface on the video game unit and wherein the power carrying interface is a game cartridge receiving slot;
   providing a timing means connected to the interrupt means for timing when power is interrupted from the power supply.

14. The method for timing the use of video games as defined in claim 13 wherein the power carrying interface is a battery interface.

15. The method for timing the use of video games as defined in claim 13 wherein the power carrying interface is a power input jack.

16. The method for timing the use of video games as defined in claim 13 wherein the video game unit is a hand held unit.

17. The method for timing the use of video games as defined in claim 13 wherein the video game unit is a console unit.

18. The method for timing the use of video games as defined in claim 13 wherein the interrupt means and the timing means are accomplished by a microcontroller.

19. The method for timing the use of video games as defined in claim 13 wherein the interrupt means and the timing means are accomplished by discrete electronic components.

20. The method for timing the use of video games as defined in claim 13 wherein the interrupt means and the timing means are software controlled.

* * * * *